(12) United States Patent
Ito

(10) Patent No.: US 6,923,653 B2
(45) Date of Patent: Aug. 2, 2005

(54) SYSTEM AND METHOD FOR ENHANCING PEOPLE'S WILL TO ACHIEVE RESULTS

(75) Inventor: Kiju Ito, Tokyo (JP)

(73) Assignees: Ricoh Company Ltd., Tokyo (JP); Ricoh Human Creates Inc., Tokyo (JP)

( * ) Notice: Subject to any disclaimer, the term of this patent is extended or adjusted under 35 U.S.C. 154(b) by 0 days.

(21) Appl. No.: 09/875,135

(22) Filed: Jun. 7, 2001

(65) Prior Publication Data

US 2002/0016733 A1 Feb. 7, 2002

(30) Foreign Application Priority Data

Jun. 7, 2002 (JP) .................................... 2000-171082

(51) Int. Cl.⁷ .............................................. G09B 19/00
(52) U.S. Cl. .................... 434/236; 434/322; 434/365
(58) Field of Search ................................ 434/236, 322, 434/365

(56) References Cited

U.S. PATENT DOCUMENTS

| | | | | |
|---|---|---|---|---|
| 5,551,880 A | * | 9/1996 | Bonnstetter et al. | 434/236 |
| 5,594,510 A | * | 1/1997 | Sakakibara | 348/731 |
| 5,722,418 A | * | 3/1998 | Bro | 600/545 |
| 5,954,510 A | * | 9/1999 | Merrill et al. | 434/236 |
| 6,159,015 A | * | 12/2000 | Buffington et al. | 434/236 |
| 6,361,326 B1 | * | 3/2002 | Fontana et al. | 434/322 |

* cited by examiner

*Primary Examiner*—Derris H. Banks
*Assistant Examiner*—John Sotomayor
(74) *Attorney, Agent, or Firm*—Oblon, Spivak, McClelland, Maier & Neustadt, P.C.

(57) ABSTRACT

A system controller selects, from a plurality of factors, one or more factors contributing to enhance people's will to achieve results, based on their responses to questions displayed on a display device. The system controller creates base data used for determining properties of the target people which are related to the selected factors, and stores the created base data in a hard disk device. Upon acquisition of the responses to the questions through the display device, the system controller determines the properties of the target people which are related to the selected factors, based on the base data stored in the hard disk device.

22 Claims, 26 Drawing Sheets

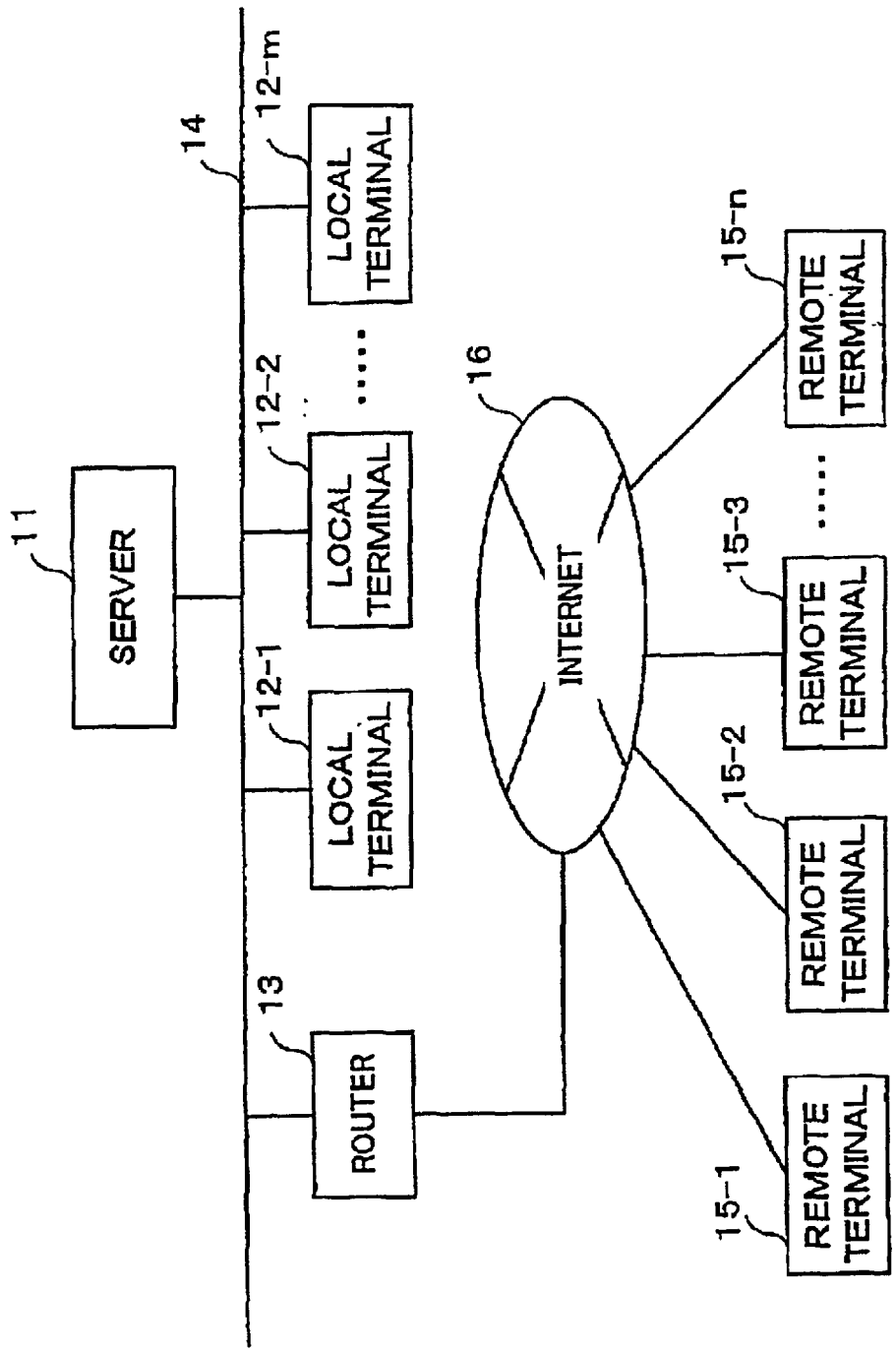

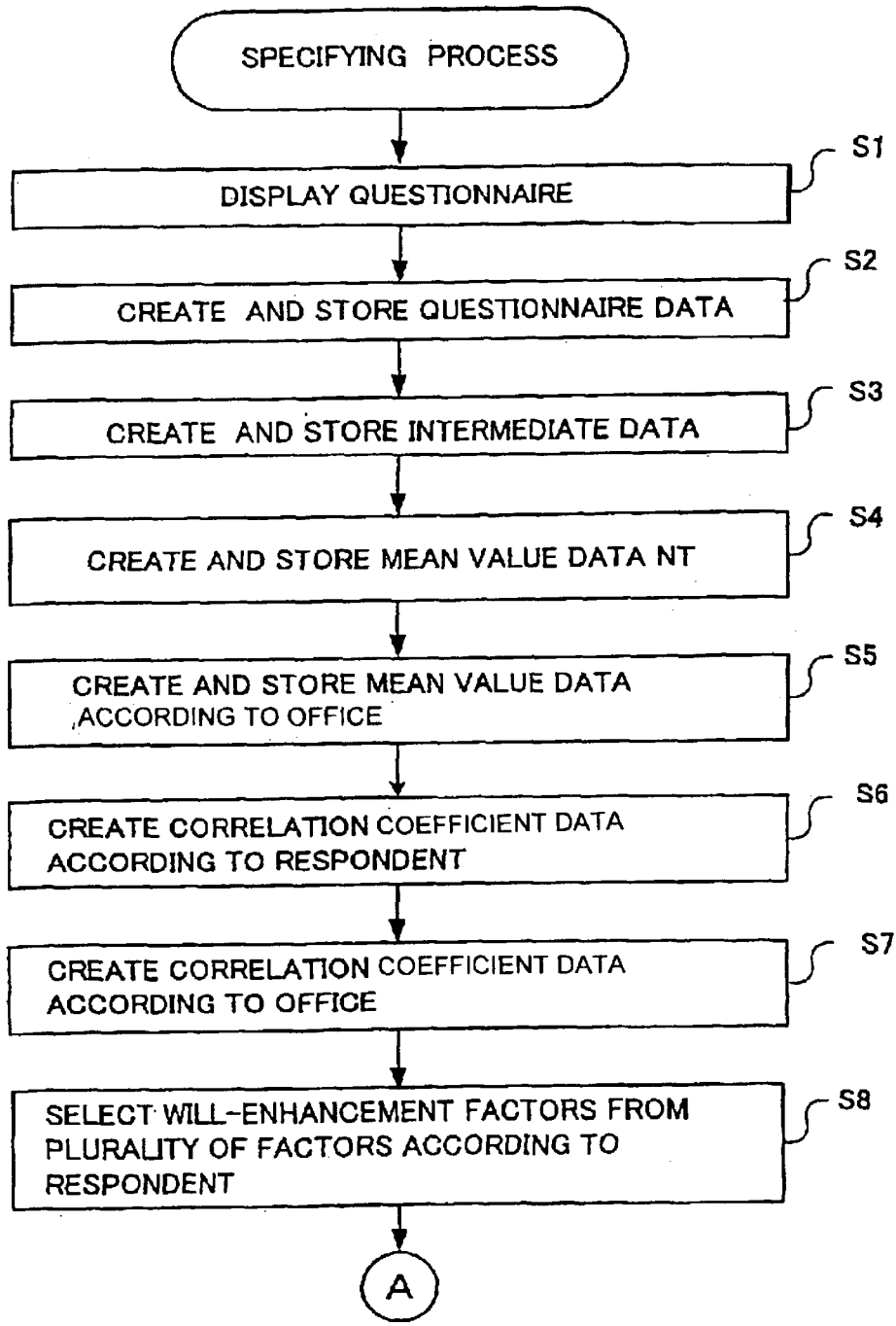

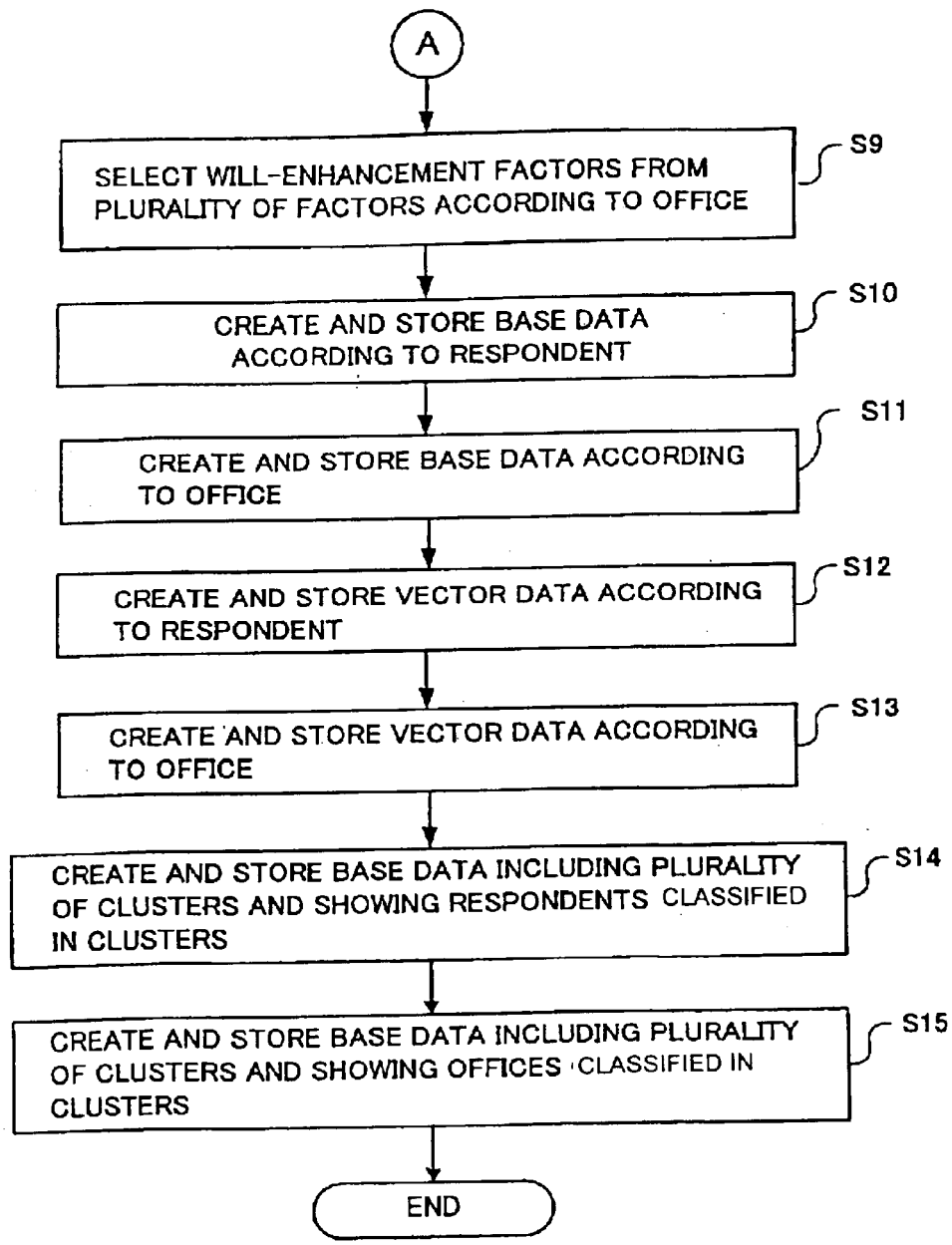

FIG.3

```
                    QUESTIONNAIRE   1. STRONGLY
        OFFICE  ☐  ─ 101a          2. SOMEHOW
                   ─ 102a  106a    3. MAYBE OR MAYBE NOT
        RESPONDENT ☐                4. PROBABLY NOT
                   ─ 103a  104a    5. RARELY
        QUESTION ☐
NO          QUESTION                              ANSWER
1. YOUR BOSS GIVES YOU POSITIVE APPRECIATION.        ☐
WHEN YOU GET ORDER
2. YOU HAVE GOOD KNOWLEDGE ABOUT THINGS        105a ☐
YOU ARE TRYING TO SELL

| OFFICE | RESPOND-ENT | SALES AMOUNT (YEN) | QUES-TION 1 | QUES-TION 2 | ... | QUES-TION 118 | QUES-TION 119 |
|---|---|---|---|---|---|---|---|
| SENDAI | xxxx | 55,000,000 | 2 | 4 | ... | 3 | 4 |
| ... | xxxx | 70,500,000 | 3 | 2 | ... | 1 | 3 |
| ... | ... | ... | ... | ... | ... | ... | ... |
| ... | ... | ... | ... | ... | ... | ... | ... |

| | OFFICE | RESPOND-ENT | SALES AMOUNT (YEN) | QUES-TION 1 | QUES-TION 9 | ... | QUES-TION 117 |
|---|---|---|---|---|---|---|---|
| FACTOR 1 | SENDAI | ××××  | 55,000,000 | 2 | 4 | ... | 4 |
| FACTOR 2 | ... | ×××× | 70,500,000 | 3 | 2 | ... | 3 |
| FACTOR 3 | ... | ... | ... | ... | ... | ... | ... |
| | ... | ... | ... | ... | ... | ... | ... |

| | OFFICE | SALES AMOUNT (YEN) | MEAN |
|---|---|---|---|
| FACTOR 1 | SENDAI | 55,000,000 | 2.5 |
| | AKITA | 48,000,000 | 1.9 |
| | ... | ... | ... |
| | ... | ... | ... |

350

FACTOR 3
FACTOR 2
FACTOR 1

| CORRELATION COEFFICIENT OF FACTOR 1 AND ANSWER OF RESPONDENT | CORRELATION COEFFICIENT OF FACTOR 2 AND ANSWER OF RESPONDENT | ... | CORRELATION COEFFICIENT OF FACTOR 19 AND ANSWER OF RESPONDENT |
|---|---|---|---|
| −0.18 | 0.32 | ... | 0.33 |

| CORRELATION COEFFICIENT OF FACTOR 1 AND ANSWER FOR OFFICE | CORRELATION COEFFICIENT OF FACTOR 2 AND ANSWER FOR OFFICE | ... | CORRELATION COEFFICIENT OF FACTOR 19 AND ANSWER FOR OFFICE |
|---|---|---|---|
| −0.19 | 0.33 | ... | 0.37 |

| WILL-ENHANCEMENT FACTOR | MEAN |
|---|---|
| WILL-ENHANCEMENT FACTOR 1 | 4.3 |
| WILL-ENHANCEMENT FACTOR 2 | 4.4 |
| WILL-ENHANCEMENT FACTOR 3 | 4.1 |
| ... | ... |
| ... | ... |

| WILL-ENHANCEMENT FACTOR | MEAN |
|---|---|
| WILL-ENHANCEMENT FACTOR 1 | 4.1 |
| WILL-ENHANCEMENT FACTOR 2 | 4.5 |
| WILL-ENHANCEMENT FACTOR 3 | 4.3 |
| ... | ... |
| ... | ... |

| RESPONDENT | VECTOR |
|---|---|
| x x x x | 4.1,4.3,4.0,4.6,3.9,4.2,4.5 |
| x x x x | 4.0,4.3,4.3,4.5,4.1,4.2,4.4 |
| ... | ... |
| ... | ... |
| ... | ... |

| OFFICE | VECTOR |
|---|---|
| x x x x | 4.3,4.2,4.0,4.5,3.8,4.3,4.4 |
| x x x x | 4.1,4.0,4.5,4.1,4.1,4.4,4.4 |
| ... | ... |
| ... | ... |
| ... | ... |

| CLUSTER | VECTOR |
|---|---|
| CLUSTER C1 | 4.01,4.15,4.16,3.88,3.61,3.72,3.75 |
| CLUSTER C2 | 3.94,3.53,3.67,3.54,3.72,3.41,3.72 |
| ... | ... |
| ... | ... |
| ... | ... |

| CLUSTER | VECTOR |
|---|---|
| CLUSTER C1 | 3.91,3.75,3.90,3.88,3.46,3.72,3.75 |
| CLUSTER C2 | 3.81,3.64,3.67,3.39,3.54,3.34,3.66 |
| ... | ... |
| ... | ... |
| ... | ... |

FIG. 13

| | | |
|---|---|---|
| CLUSTER C1 | A-TYPE (SUPER HIGH LEVEL) | 17 |
| CLUSTER C2 | B-TYPE (HIGH LEVEL, HIGH LEVEL IN "COOPERATIVENESS") | 16 · · 20 · |
| CLUSTER C3 | C-TYPE (HIGH LEVEL, HIGH LEVEL IN "FEELING OF SELF USEFULNESS TO OTHERS") | 23 · 7 · · 15 |
| CLUSTER C4 | D-TYPE (AVERAGE LEVEL, LOW LEVEL IN "FEELING OF SELF USEFULNESS TO OTHERS") | 8 · 22 · · 1 19 · · 9 · 21 · 12 |
| CLUSTER C5 | E-TYPE (AVERAGE LEVEL, LOW LEVEL IN "COOPERATIVENESS") | 4 · · · 11 · 14 · 18 · · 13 |
| CLUSTER C6 | F-TYPE (LOW LEVEL) | 5 · 6 · · · 3 · |
| CLUSTER C7 | G-TYPE (HIGH IN "DESIRABLE POSITION" AND "CONFIDENCE IN ONE'S SKILL") | 10 |

FIG.15

```
                    ┌─ 800
                          ┌─ 800b
                   ┌─800a
              QUESTIONNAIRE   1. STRONGLY
    OFFICE  ☐  ─ 801a        2. SOMEHOW
                      806a   3. MAYBE OR MAYBE NOT
 RESPONDENT ☐  ─ 802a
                   803a  804a 4. PROBABLY NOT
   QUESTION ☐  ─              5. RARELY
NO        QUESTION                            ANSWER
1. YOUR BOSS GIVES YOU POSITIVE APPRECIATION, WHEN  ☐
YOU GET ORDER
2. YOU HAVE GOOD KNOWLEDGE ABOUT THINGS       805a  ☐
YOU ARE TRYING TO SELL
3           ...                                     ☐
4           ...                                     ☐
5           ...                                     ☐
6           ...                                     ☐
7           ...                                     ☐
8           ...                                     ☐
9           ...                                     ☐
10          ...                                     ☐
CONTINUED
```

FIG.16

| OFFICE | RESPOND-ENT | SALES AMOUNT (YEN) | QUES-TION 1 | QUES-TION 2 | ... | QUES-TION 118 | QUES-TION 119 |
|---|---|---|---|---|---|---|---|
| SENDAI | xxxx | 55,000,000 | 2 | 4 | ... | 3 | 4 |

| | COOPERA-TIVENESS | DESIRABLE POSITION IN WORK-FORCE | USING ONE'S DISCRETION | FEELING OF SELF USEFULNESS TO OTHERS | POSITIVE MIND | CONFIDENCE IN ONE'S SKILLS | SELF CONFIDENCE |
|---|---|---|---|---|---|---|---|
| CLUSTER C1 | 3.91 3.54~ | 3.75 3.56~ | 3.90 3.48~ | 3.88 3.40~ | 3.60 3.46~ | 3.72 3.40~ | 3.75 3.50~ |
| CLUSTER C2 | 3.81 3.66~ | 3.64 3.50~ | 3.67 3.42~ | 3.39 3.34~ | 3.54 3.40~ | 3.43 3.34~ | 3.66 3.44~ |
| CLUSTER C3 | 3.48 3.48~ | 3.44 3.50~ | 3.48 3.42~ | 3.64 3.52~ | 3.35 3.40~ | 3.53 3.34~ | 3.54 3.44~ |
| CLUSTER C4 | 3.50 3.31~3.61 | 3.52 3.33~3.63 | 3.16 3.25~3.55 | 3.17 ~3.20 | 3.37 3.23~3.53 | 3.27 3.17~3.47 | 3.37 3.27~3.57 |
| CLUSTER C5 | 3.30 ~3.34 | 3.43 3.33~3.63 | 3.26 3.25~3.55 | 3.39 3.17~3.47 | 3.43 3.23~3.53 | 3.30 3.17~3.47 | 3.38 3.27~3.57 |
| CLUSTER C6 | 3.23 ~3.44 | 3.32 ~3.46 | 3.19 ~3.38 | 3.06 ~3.30 | 3.15 ~3.36 | 3.07 ~3.30 | 3.21 ~3.40 |
| CLUSTER C7 | 2.94 | 4.20 3.68~ | 3.10 | 3.17 | 3.71 | 4.00 3.52~ | 3.70 3.62~ |
| MEAN | 3.46 | 3.48 | 3.40 | 3.32 | 3.38 | 3.32 | 3.42 |

FIG. 19B

| | COOPERA-TIVENESS | DESIRABLE POSITION IN WORK-FORCE | USING ONE'S DISCRETION | FEELING OF SELF USEFULNESS TO OTHERS | POSITIVE MIND | CONFIDENCE IN ONE'S SKILLS | SELF CONFIDENCE |
|---|---|---|---|---|---|---|---|
| GROUP 1 | 3.70 | 3.65 | 3.53 | 3.30 | 3.56 | 3.64 | 3.57 |
| GROUP 2 | 3.21 | 3.35 | 3.31 | 3.22 | 3.29 | 3.20 | 3.32 |
| GROUP 3 | 3.64 | 3.57 | 3.38 | 3.55 | 3.47 | 3.53 | 3.60 |

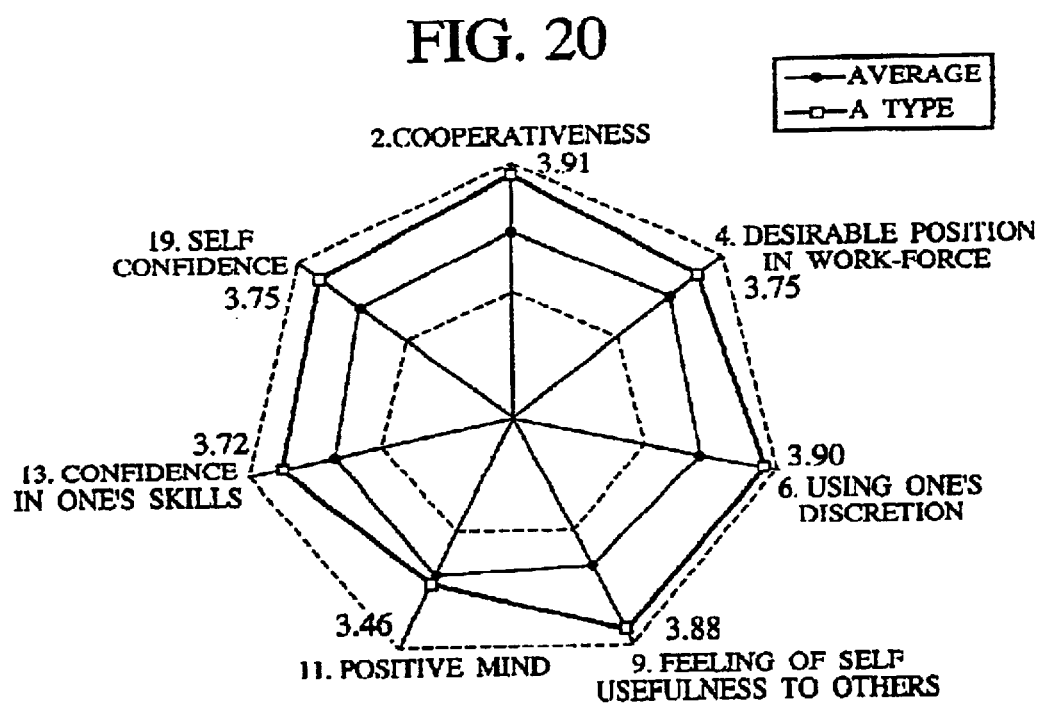

FIG. 27A

| ID | EMPLOYEE | E-MAIL | BOSS | E-MAIL |
|---|---|---|---|---|
| K001234 | YAMADA Kiro | zashiki@rico.com | KOZUMI Ichiro | kakashi@rico.com |
| K001236 | NOGUCHI Midori | neko@rico.com | KOZUMI Ichiro | kakashi@rico.com |
| K001242 | TAMURA Kuro | warashi@rico.com | KOZUMI Ichiro | kakashi@rico.com |
| K002567 | KOMIZO Shiro | buta@rico.com | NAKADA Maki | wadachi@rico.com |
| ...... | ...... | ...... | ...... | ...... |

FIG. 27B

| FACTOR | ADVISORY DATA |
|---|---|
| 1 | ............ |
| 2 | ............ |
| 3 | ............ |
| ...... | ............ |
| 7 | ............ |

FIG. 27C

| RADAR CHART | ADVISORY DATA |
|---|---|
| TYPE A | ............ |
| TYPE B | ............ |
| TYPE C | ............ |
| ...... | ............ |
| TYPE K | ............ |

SYSTEM AND METHOD FOR ENHANCING PEOPLE'S WILL TO ACHIEVE RESULTS

BACKGROUND OF THE INVENTION

1. Field of the Invention

The present invention relates to a system and method for specifying factors contributing to enhance people's will to achieve results (to improve their ability) and a system and method for determining properties of people which are related to the specified factors.

2. Description of the Related Art

To achieve business results or improve any ability, there are employed some tools including: (a) a training tool, in the field of business, for improving "listening ability", "presentation performance", "planning", etc.; (b) a methodology for efficient business achievement, such as "ABC analysis"; and (c) a tool for realizing business results, such as "management with a set goal".

Even if such training tools are employed in the sales sections, there still remains a gap between those who achieve high business results and those who do not.

For example, suppose there are two sales persons both of who have almost the same business skills and in the same circumstances. Even in this case, there should be some gap in their business results between the two. Sometimes, a new employee may get better results than another sales person having much experience.

One of the reasons why there is the gap in the business results between the two types of sales persons is that they have or lack "the will to do it".

No one yet has correctly found or specified factors which cause workers to have a mind to do it. Therefore, it is not possible to evaluate the will-enhancement factor of each individual sales person or sales division. As a result of this, no adequate instructions (or advises) for encouraging sales persons (or sales groups) to get business results can be provided.

There are similar problems for any field such as study, business, sports and so on.

SUMMARY OF THE INVENTION

The present invention has been made in consideration of the above. It is accordingly an object of the present invention to provide a system and method for specifying factors contributing to enhance workers' will to achieve results.

Another object thereof is to provide a system and method for determining properties of people which are related to the selected factors.

In order to achieve the above objects, according to the first aspect of the present invention, there is provided a selection system which includes a processor (controller, and so on) and an output device, and selects, from a plurality of factors, one or more factors reliably contributing to enhance target people's will to achieve results, and wherein:

said output device outputs (transmits, sends, supplies, provides, displays, prints, and so on) one or more questions related to the plurality of factors, so as to show the one or more questions to one or more target people;

said processor receives a response to each of the one or more questions output by said output device, calculates a correlation coefficient of information representing work done by the one or more target people and an evaluation value numerically representing the response to each of the one or more questions, and selects the one or more factors reliably contributing to enhance the one or more target people's will to achieve results, from the plurality of factors, in a case where the calculated correlation coefficient is equal to or larger than a reference value.

According to the above structure, of a plurality of factors contributing to enhance workers' will to achieve business results, a predetermined number of factors reliably contributing to enhance workers' will to achieve business results can be specified.

The system may include a memory device, and said processor may store, in said memory device, the evaluation value numerically representing the response to each of the one or more questions, as reference data used for determining properties of the one or more target people which are related to the one or more selected factors.

The system may comprise a memory device, and said processor: generates an evaluation value vector including a plurality of evaluation values each numerically representing the response to each of the one or more questions related to the one or more selected factors; generates a cluster of one or move evaluation value vectors showing similar tendency to each other; and stores the one or more evaluation value vectors of the generated cluster in the storage device, as reference data used for determining properties of the one or more target people which are related to the one or more selected factors.

In order to achieve the above objects, according to the second aspect of the present invention, there is provided a selection system which selects, from a plurality of factors, one or more factors reliably contributing to enhance people's will to achieve results, said system comprising:

output means for outputting (transmitting, sending, providing, supplying, printing, displaying, and so on) one or more questions related to the plurality of factors, thereby to show the one or more questions to one or more target people;

reception means for receiving a response to each of the one or more questions output by said outputting means;

calculation means for calculating a correlation coefficient of information representing work done by the one or more target people and an evaluation value numerically representing the response to each of the one or more questions; and selection means for selecting the one or more factors reliably contributing to enhance the one or more target people's will to achieve results, from the plurality of factors, in a case where the calculated correlation coefficient is equal to or larger than a reference value.

In order to achieve the above objects, according to the third aspect of the present invention, there is provided a method for selecting, from a plurality of factors, one or more factors reliably contributing to enhance people's will to achieve results, said method comprising the steps of:

outputting (providing, supplying, transmitting, sending, printing, displaying, and so on) one or more questions related to the plurality of factors, thereby to show the one or more questions to one or more target people;

receiving (obtaining) a response to each of the output one or more questions;

calculating a correlation coefficient of information representing work done by the one or more target people and an evaluation value numerically representing the response to each of the one or more questions, and selecting the one or more factors reliably contributing to enhance the one or more target people's will to achieve results, from the plurality of factors, in a case where the calculated correlation coefficient is equal to or larger than a reference value.

According to the above structure, of a plurality of factors contributing to enhance workers' will to achieve business results, a predetermined number of factors reliably contributing to enhance workers' will to achieve business results can be selected.

The method may include the step of storing the evaluation value numerically representing the response to each of the one or more questions, as reference data used for determining properties of the one or more target people which are related to the one or more selected factors.

The method may include the steps of:

generating an evaluation value vector including a plurality of evaluation values each numerically representing the response to each of the one or more questions related to the one or more selected factors;

generating a cluster of one or move evaluation value vectors showing similar tendency to each other; and storing the one or more evaluation value vectors of the generated cluster in the storage device, as reference data used for determining properties of the one or more target people which are related to the one or more selected factors.

In order to achieve the above objects, according to the fourth aspect of the present invention, there is provided a program for controlling a computer to execute the steps of:

outputting (supplying, displaying, printing, and so on) one or more questions related to a plurality of factors which are to contribute to enhance people's will to enhance results, thereby to show the one or more questions to target people;

receiving a response to each of the output one or more questions;

calculating a correlation coefficient of information representing work done by the target people and an evaluation value numerically representing the response to each of the one or more questions, and selecting, from the plurality of factors, one or more factors reliably contributing to enhance the one or more target people's will to achieve results, in a case where the calculated correlation coefficient is equal to or larger than a reference value.

According to the above structure, of a plurality of factors contributing to enhance workers' will to achieve business results, a predetermined number of factors reliably contributing to enhance workers' will to achieve business results can be selected.

In order to achieve the above objects, according to the fifth aspect of the present invention, there is provided a determination system which includes a processor, an output device and a memory, and determines properties of target people which are related to one or more factors reliably contributing to enhance people's will to achieve results, and wherein:

said memory stores reference data used for determining properties of the target people which are related to the one or more factors;

said output device outputs (supplies, displays, prints, and so on) one or more questions related to the one or more factors, so as to show the one or more questions to the target people; and said processor
receives a response to each of the one or more questions output by said output device, and
refers to the reference data stored in said memory, and determines the properties of the target people which are related to the one or more factors based on an evaluation value numerically representing the response to each of the one or more questions.

According to the above structure, of a plurality of factors contributing to enhance workers' will to achieve business results, the factors reliably contributing to enhance workers' will to achieve business results can be selected. The reference data may include the evaluation value numerically representing the response to each of the one or more questions.

The reference data may be an evaluation value vector, which includes a plurality of evaluation values each numerically representing the response to each of the one or more questions related to the one or more factors, and which belongs to a cluster of one or move evaluation value vectors showing similar tendency to each other.

Said processor may refer to responses to the one or more questions from a same group of a plurality of respondents, and determine properties of the group which are related to the one or more factors reliably contributing to enhance the target people's will to achieve results.

Said processor may show an instruction which is created in accordance with the determined properties of the target people, to the target people.

Said output device may output the determined properties of the target people.

In order to achieve the above objects, according to the sixth aspect of the present invention, there is provided a determination system which determines properties of target people which are related to one or more factors reliably contributing to enhance people's will to achieve results, said system comprising:

storage means for storing reference data used for determining the properties of the target people which are related to the one or more factors;

output means for outputting (supplying, providing, sending, printing, displaying, transmitting, and so on) one ore more questions related to the one or more factors, so as to show the one or more questions to the target people;

reception means for receiving a response to the one or more questions; and determinations means for determining properties of the target people which are related to the one or more factors, based on an evaluation value numerically representing the response to each of the one or more questions, using the reference data stored in said storage means.

In order to achieve the above objects, according to the seventh aspect of the present invention, there is provided a method for determining properties of target people which are related to one or more factors reliably contributing to enhance people's will to achieve results, said method comprising the steps of:

storing reference data used for determining the properties of the target people;

outputting (supplying, providing, displaying, printing and so on) one or more questions related to the one or more factors;

receiving a response to the one or more questions;

determining the properties of the target people which are related to the one or more factors, based on an evaluation value numerically representing the response to each of the one or more questions, using the reference data stored in said storage means.

According to the above structure, of a plurality of factors contributing to enhance workers' will to achieve business results, a predetermined number of factors reliably contributing to enhance workers' will to achieve business results can be selected.

The reference data may include the evaluation value numerically representing the response to each of the one or more questions related to the one or more factors.

The reference data may be an evaluation value vector, which includes a plurality of evaluation values each numerically representing the response to each of the one or more questions related to the one or more factors, and which belongs to a cluster of one or move evaluation value vectors showing similar tendency to each other.

The method may further comprise the steps of:

referring to responses to the one or more questions from a same group of a plurality of respondents; and determining properties of the group which are related to the one or more factors reliably contributing to enhance the target people's will to achieve results.

The method may further comprise the step of showing an instruction which is created in accordance with the determined properties of the target people, to the target people.

The method may further comprises the step of outputting the determined properties of the target people which are related to the one or more factors.

In order to achieve the above objects, according to the eights aspect of the present invention, there is provided a program for controlling a computer to execute the steps of:

outputting one or more questions related to one or more factors reliably contributing to enhance people's will to enhance results, thereby to show the one or more questions to the target people;

receiving a response to each of the one or more questions; and determining properties of the target people which are related to the one or more factors, based on an evaluation value numerically representing the response to each of the one or more questions, using reference data used for determining the properties of the target people.

According to tie above structure, of a plurality of factors contributing to enhance workers' will to achieve business results, a predetermined number of factors reliably contributing to enhance workers' will to achieve business results can he selected.

BRIEF DESCRIPTION OF THE DRAWINGS

These objects and other objects and advantages of the present invention will become more apparent upon reading of the following detailed description and the accompanying drawings in which:

FIG. 1 is a block diagram showing the structure of a system according to an embodiment of the present invention;

FIGS. 2A and 2B show a flowchart of the process for specifying the will-enhancement factors;

FIG. 3 is a diagram showing a web page, for filling a questionnaire;

FIG. 4 is a diagram showing the data structure of a result of questionnaires;

FIG. 5 is a diagram showing the data structure of intermediate data to be further processed;

FIG. 7 is a diagram showing the data structure of means values of sales amounts according to office;

FIG. 8A is a diagram showing the data structure of correlation coefficient data of factors, contributing to enhance workers' will to achieve business results, and answers of respondents, and FIG. 8B is a diagram showing the data structure of correlation coefficient data of the factors and answers;

FIG. 10A is a diagram showing the data structure of a relationship between each of the plurality of factors and the respondents' answers, and FIG. 10B is a diagram showing the data structure of a relationship between each of the plurality of factors and the workers' answers in the unit of office;

FIG. 11A is a diagram showing the structure of vector data according to respondent, and FIG. 11B is a diagram showing the structure of vector data according to office;

FIGS. 12A and 12B are diagrams each showing the structure of base data classified in clusters;

FIG. 13 is a diagram for exemplarily showing clusters according to office;

FIG. 15 is a diagram showing a display page for inputting answers of questions for determining properties of respondents which are related to the selected factors;

FIG. 16 is a diagram showing the data structure of response data;

FIGS. 19A and 19B are diagrams each showing base data including representative values of each will-enhancement factor, according to office;

FIG. 20 is a radar chart showing mean values of the respective will-enhancement factors which are included in the base data and answers of respondent to be evaluated, in terms of cluster C1 shown in FIGS. 12A and 12B;

FIG. 27A shows an example of personnel data, and FIGS. 27B and 27C show examples of advisory data.

DETAILED DESCRIPTION OF THE PREFERRED EMBODIMENTS

Explanations will now be made to a system of an embodiment of the present invention based on the accompanying drawings.

The system carries out a process (hereinafter, referred to simply as a selection process) for specifying will-enhancement factor contributing to enhance workers' will to achieve business results, and a process (hereinafter, referred to simply as a determination process) for determining properties of a particular group of people which are related to the selected will-enhancement factors.

As shown in FIG. 1, the system according to the embodiment of the present invention comprises a server 11, local terminals 12-1 to 12-m (m=the total number of local terminals), a router 13, remote terminals 15-1 to 15-n (n=the total number of remote terminals which are installed in remote office). The server 11, the local terminals 12-1 to 12-m, and the router 13 are connected on a LAN (Local Area Network) 14. The remote terminals 15-1 to 15-n are connected to the server 11 through ISPs (Internet Service Provider; not shown), the Internet 16, the router 13, and the LAN 14.

Figure 1A:
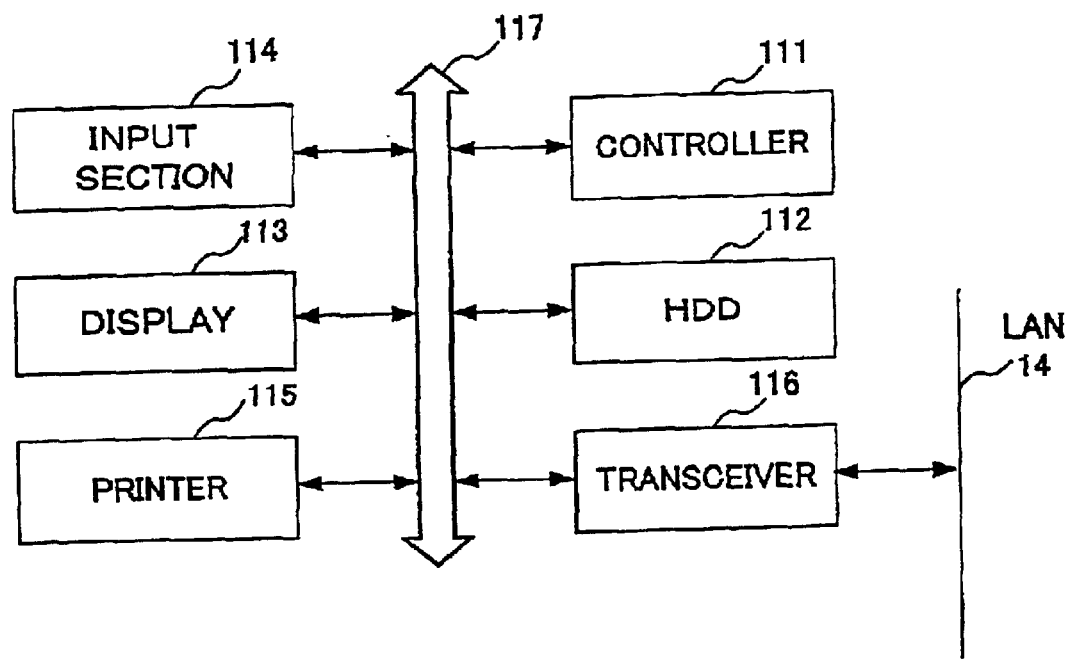
FIG. 1A is a block diagram showing the structure of the server shown in FIG. 1.

As shown in FIG. 1A, the server 11 includes; a controller 111, a hard disk device (HDD) 112, a display device 113, an input section 114, a printer 115 and a transceiver (communication unit) 116.

The controller 111, the hard disk device 112, the display device 113, the input section 114, the printer 115 and the transceiver 116 are connected with one another through a bus 117.

The controller 111 includes a CPU (Central Processing Unit), a ROM (Read Only Memory), and a RAM (Random Access Memory). The CPU executes a control program, and carries out the process for specifying the will-enhancement factors and determining properties of target people which are related to the will-enhancement factors. The ROM stores basic control program to be executed by the CPU. The RAM stores data, and serves as a work area for the CPU.

The hard disk device (HDD) 112 stores application program to be executed by the CPU for specifying the will-enhancement factors and determining the properties of the target people, questionnaires to be provided to a plurality of sales persons for specifying the will-enhancement factors and for determining the properties of target people; a basic control program to be executed by the CPU, and data used for determining will-enhancement factors and determining the properties.

The display device 113 displays data and information.

The input section 114 includes an input device, such as a keyboard, mouse, and the like.

The printer 115 prints data.

The transceiver 116 transmits (sends and receives) data with the local terminals 12-1 to 12-m through the LAN 14 and with the remote terminals 15-1 to 15-n through the LAN 14, the router 13, and the Internet 16.

The local terminals 12-1 to 12-m shown in FIG. 1 are for sales person's business use, are comprises, for example, personal computers to which a browser is installed and can communicate the server 11 through the LAN 14. The local terminals The router 13 includes firewall and controls the communication between server 11 and the Internet 16.

The server 11, local terminals 12-1 to 12-m and the router 13 are installed, for example, a head office or personnel section of company.

The remote terminals 12-1 to 12-m shown in FIG. 1 are for sales person's use, are arranged in remote offices, are comprised of, for example, personal computers to which a browser is installed and can communicate the server 11 through the Internet 16, the router 13 and the LAN 14.

Explanations will now be made to the operation of the system of the embodiment, which carries out (1) the specifying process and (2) the determination process.

The specifying process is a process for selecting the will-enhancement factors truly contributing to enhance sales person's will to work from candidates of the will-enhancement factors.

The determining process is a process for determining properties (characteristics) of sales persons which arc related to the selected will-enhancement factors. In other words, it is a process for determine the sales person or persons are how sensitive to each of the selected will-enhancement factors.

(1) The specifying process will now be explained with reference to a flowchart shown in FIGS. 2A and 2B.

To specify the will-enhancement factors, a plurality of sales persons are will be tested.

Each of the sales person uses their local terminal 12-$i$ (i=1 to m) or remote terminal 15-$j$ (j=1 to n) to access the server 11 and requests questionnaire for specifying the will-enhancement factors.

The controller 111 of the server 11 receives the request through the transceiver 116 and bus 117 and reads out the questionnaire from the HDD 112 and sends it to the local terminal 12-$i$ or the remote terminal 15-$j$. The local terminal 12-$i$ or the remote terminal 15-$j$ receives the questionnaire and displays pages for showing questions, for selecting reliable will-enhancement factors reliably contributing to enhance the sales persons' will to achieve business results, of a plurality of candidates of factors (step S1).

As shown in FIG. 3, the displayed first page 100a include a portion (text box) 101a for inputting an office of respondent, a portion 102a for inputting the respondent's name, a portion 103a for inputting an sales amount of business done by the respondent, and a plurality of questions 104a for selecting reliable will-enhancement factors from nineteen factors. The second and following pages 100b include a plurality of questions.

Next to each of the questions 104a, a portion 105a for inputting a numerical value representing the answer of the question is arranged.

The questionnaire includes questions regarding nineteen factors (pre-selected candidates of will-enhancement factors for sales), based on which reliable will-enhancement factors can be determined, such as (1) good human relations, (2) having cooperativeness, (3) having got compliment from others, (4) desirable position in work-force, (5) reflection of one's ideas about business, (6) using one's discretion, (7) feeling of having attained goal, (8) good payment of business results, (9) having feeling of self usefulness to others, (10) being in good health, (11) having positive mind, (12) having professional mind, (13) confidence in one's skill, (14) having sense of mission, (15) careers, (16) attachment to sales goods, (17) vision in business, (18) directive position, and (19) self confidence. Each question is assigned to one factor.

For example, the factor (3), compliment from others, includes words of appreciation, encouragement and reprimand from the sales person's boss (supervisor). The factor (4), personnel performance evaluation, includes satisfaction of the personnel performance evaluation. The factor (8), pay, includes satisfaction of the business results done by the sales person and the amount of money paid for the business results. The factor (14), sense of mission, includes the feeling of being pride of him/herself being in the business or the sense of mission to the business. The factor (18), desire, includes desire to take the sales business or vocational aptitude as a sales person. The factor (19), self confidence, includes self confidence as a sales person.

The numerical which is input in each of the portion 105a is one of 1 to 5:

1. Strongly;
2. Somehow;
3. Maybe or Maybe Not;
4. Probably Not; and
5. Rarely.

To prevent any artificial answers, one hundred nineteen questions are randomly displayed, for example.

The respondent inputs answers to the questions one by one. Once the questionnaire displayed on the pages 100 is completely filled out, the respondent clicks a button "execute" arranged on the last page by the input section 114.

In response to this operation, the browser of the local terminal 12-$i$ or the remote terminal 15-$j$ sends the input data to the server 11.

The controller 111 of the server 11 forms questionnaire data 200 shown in FIG. 4, based on received data and stores it the HDD 112 (Step S2).

The questionnaire data 200 is a list personal data and answers of the respondents. Specifically, the questionnaire data 200 includes, as shown in FIG. 4, data items of "Office Name" of the office to which a corresponding respondent belongs, "Respondent Name", "Sales Amount" regarding sales done by the respondent of the questionnaire, and "Answer" of the one hundred nineteen questions included in the questionnaire.

After the questionnaire data 200 of a predetermined number of respondents, the controller 111 classifies the questionnaire data 200 in accordance with the factors to create intermediate data 250 shown in FIG. 5 and stores the intermediate data 250 in the HDD 112 (Step S3).

The intermediate data 250 includes, as shown in FIG. 5, data items of "Office Name", "Respondent Name", "Sales Amount of Respondent", and "Numerical Value of Answer of Question" for each factor.

Figure 6:
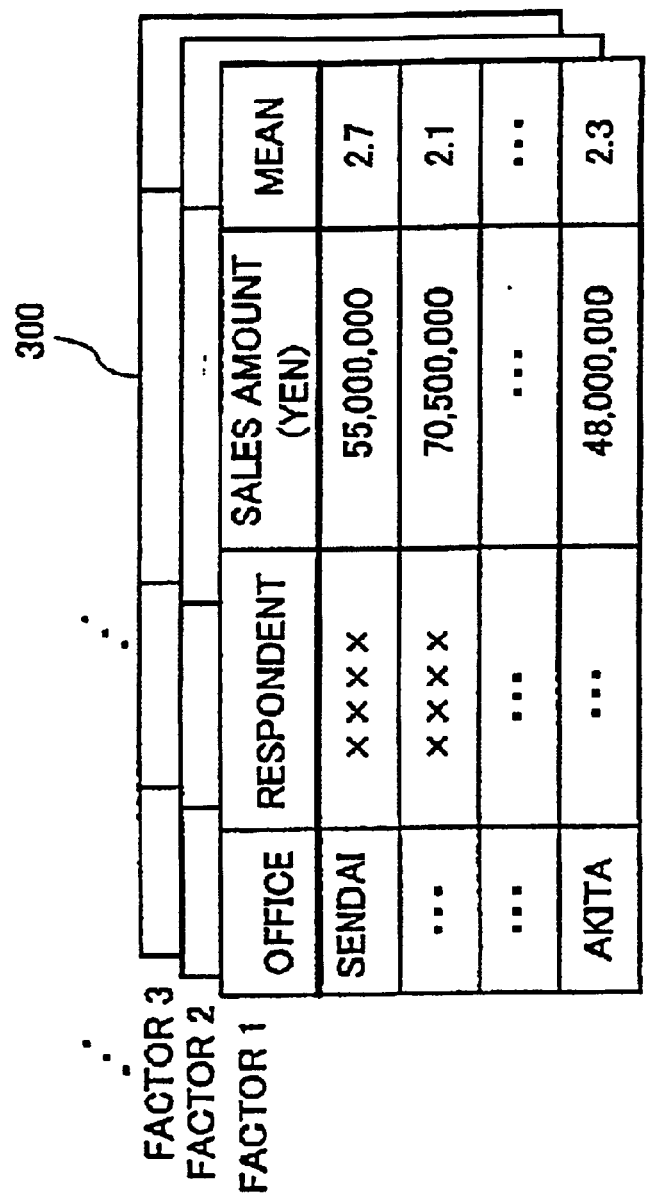
FIG. 6 is a diagram showing the data structure of mean values of sales amounts according to respondent.

Subsequently, the controller 1 obtains mean values of each group of questions which corresponds to each will-enhancement factor to create, as shown in FIG. 6, mean value data 300 according to respondent, and stores the created mean value data 300 in the HDD 112 (Step S4). The mean value data 300 includes, as shown in FIG. 6, data items of "Office Name", "Respondent Name", "Sale Data of Respondent", and "Calculated Mean Value", for each factor.

The mean values of the answers of the questions can be obtained as follows:

The controller 111 sets the numerical values of the answers of the question which the read intermediate data 250 represents to predetermined values. Specifically; if the numerical value of an answer is "1", the controller 111 sets the value to "5"; if the value of an answer is "2", the controller 111 sets the value to "4"; if the value of an answer is "3", the controller 111 sets the value to "3"; if the value of an answer is "4", the controller 111 sets the value to "2"; and if the value of an answer is "5", the controller 111 sets the value to "1". After this, the controller 111 adds the set values in the unit of factors, and divides a resultant addition by the number of questions, so as to obtain the mean value.

The controller 111 reads out mean values of the same factor in the unit of each office from the mean value data 300 and adds the read mean values of the same factor with each other, and adds sales amount of the respondents in the unit of each office.

The controller 111 divides a resultant addition of the mean values, by the number of the read mean values, and divides a resultant addition of the sale data, by the number of the sales amount, thereby to obtain a mean value of the answers for each factor according to office and a mean value of the sale data according to office. The controller 111 creates mean value data 350 according to office showing the calculated values, and stores it in the HDD 112 (Step S5).

As illustrated in FIG. 7, the mean value data 350 according to office includes data items of "Office Name", "Mean Value of Sales Amounts According to Office", and "Mean Value of Answers Corresponding to Particular Factor".

Then, the controller 111 reads out the mean value data 300 according to respondent from the HDD 112, obtains a correlation coefficient $\gamma1$ of each factor and answers of respondents based on the mean value data 300 to generate correlation coefficient data 400 according to respondent, as shown in FIG. 8A, and stores the created correlation coefficient data 400 in the HDD 112 (Step S6).

A method for deriving the correlation coefficient will now be described.

The controller 111 calculates the covariance S using the sales amounts and the mean values included in the mean value data 300 according to respondent. The controller 111 also calculates the standard deviation T1 of the mean values and the standard deviation T2 of the sale amounts. The controller 111 divides the calculated covariance S by the standard deviation T1 and the standard deviation T2, so as to calculate the correlation coefficients $\gamma1$.

The correlation coefficients according to factor are described in a range from −1 to +1. The correlation between the mean values and sales amounts is negative, if the coefficient is closer −1 than +1, whereas the correlation therebetween is positive, if the coefficient is closer to +1 than −1, and no correlation therebetween, if the coefficient is zero.

Then, the controller 111 calculates correlation coefficients $\gamma2$ of each factor and each office, in the same manner as the above, using the mean value data 350 according to office which is stored in the HDD 112. The controller 111 creates correlation coefficient data 450 of each factor and answer from office, based on the correlation coefficients $\gamma2$ of the entire factors, as shown in FIG. 8B and stores it in the HDD 112 (Step S7). The correlation coefficient data 450 according to office includes correlation coefficients $\gamma2$ of the entire nineteen factors and answers of the respondents of each office.

Next, the controller 111 selects some factors each showing the correlation coefficient of equal to or larger than 0.15, as will-enhancement factors contributing to enhance workers' will to achieve business results according to respondent, using the correlation coefficient data 400 according to respondent (Step S8).

In the similar manner, the controller 111 selects some factors each showing the correlation coefficient of equal to or larger than 0.15, as will-enhancement factors contributing to enhance workers' will to achieve business results according to office, using the correlation coefficient data 450 (Step S9).

Figure 9:
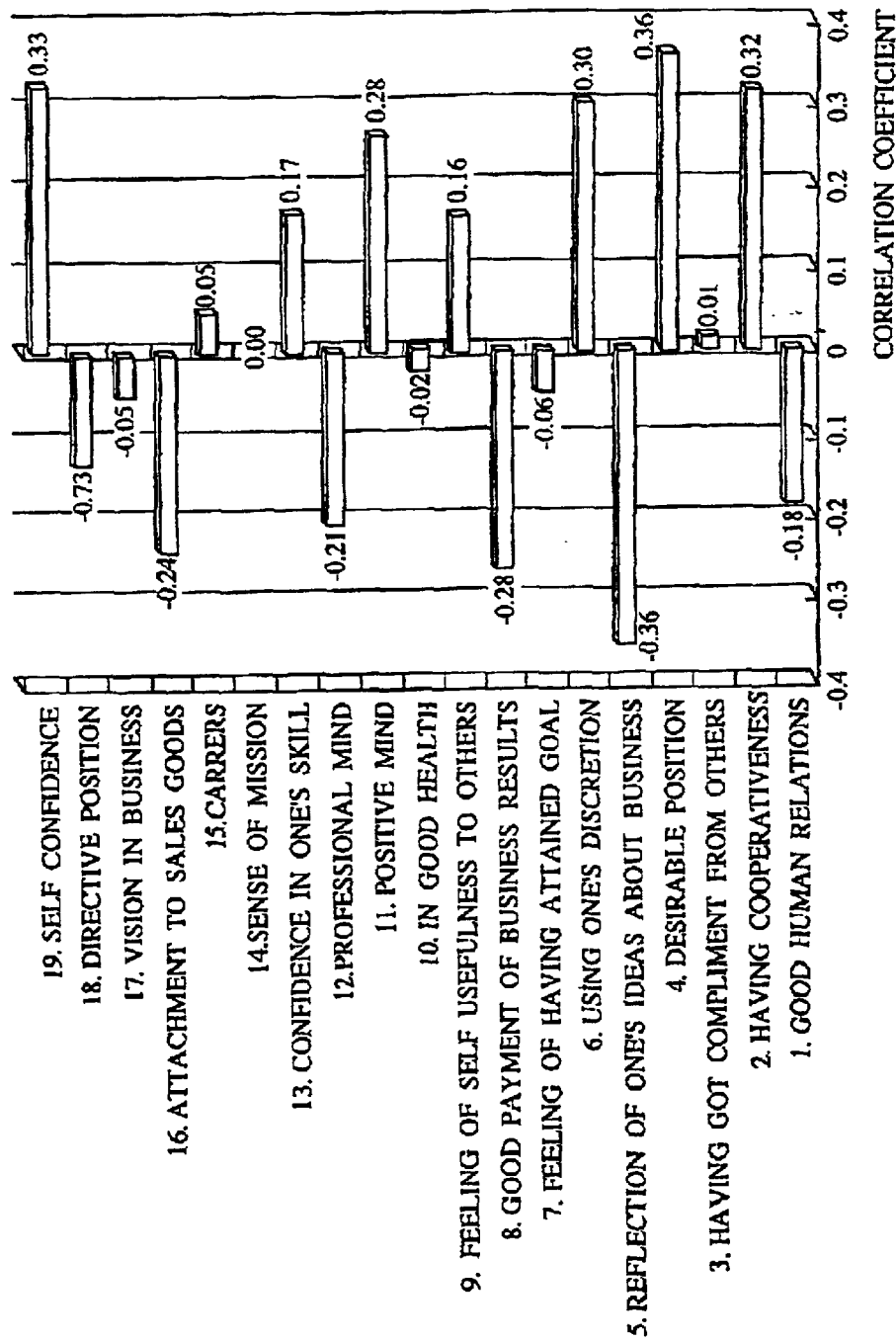
FIG. 9 is a diagram showing correlation coefficients of each factor, contributing to enhance workers' will to achieve business results, and answers of respondents of questionnaires.

FIG. 9 shows an example of correlation coefficients of the factors. In the example of FIG. 9, each of those factors of "having cooperativeness", "desirable position in workforce", "using one's discretion", "having feeling of self usefulness to others", "having positive mind", "confidence in one's skill", "self confidence" has a high correlation coefficient, wherein the sales amounts and mean values of the answers are in positive correlation. The controller 111 selects the factors (2), (4), (6), (9), (11), (13), and (19), as will-enhancement factors contributing to enhance workers' will to achieve business results.

The controller 111 sets thus selected factor (1) as a will-enhancement factor (1), the factor (4) as a will-enhancement factor '2', the factor (6) as a will-enhancement factor '3', the factor (9) as a will-enhancement factor '4', the factor (11) as a will-enhancement factor '5', the factor (13) as a will-enhancement factor '6', and the factor (19) as a will-enhancement factor '7'.

Upon specifying the will-enhancement factors from the candidates, the controller 111 reads out the entire mean values related to the selected will-enhancement factors, of the mean value data 300 according to respondent which is stored in the HDD 112. After this, the system controller newly obtains mean values of the calculated mean values included in the mean value data 300, and create base data 500 according to respondent, which includes the will-enhancement factors and mean values of the respective will-enhancement factors in association with each other, as shown in FIG. 10A. Then, the controller 111 stores the created base data 500 in the HDD 112, as base data used for determining properties of a particular person which are related to the selected will-enhancement factors (Step S10).

Similarly, the controller 111 reads out the entire mean values, related to the selected will-enhancement factors, which are included in the mean value data 350 stored in the HDD 112. After this, the controller 111 newly obtains mean values of the calculated mean values of the mean value data 350, and create data 550 (hereinafter, referred to as office base data) including the selected will-enhancement factors and mean values of the respective will-enhancement factors, as shown in FIG. 10B. After this, the controller 111 stores the created office base data 550 in the HDD 112, as base data for determining properties of workers which are related to the will-enhancement factors (Step S11).

Subsequently, the controller 111 reads out the mean value data 300 according to respondent which is stored in the HDD 112, with using data representing respondents and the will-enhancement factors as keys. After this, the controller 111 creates a vector of a set of mean values of each will-enhancement factor, according to respondent. In particular, as shown in FIG. 11A, the controller 111 create vector data 600 according to respondent which includes respondents and vectors in association with each other, and stores the created vector data 600 in the HDD 112 (Step S12).

Similarly, the controller 111 reads out the mean value data 350 stored in the HDD 112, while using data representing predetermined offices and the will-enhancement factors as keys. Then, the controller 111 creates a vector of the mean values of each will-enhancement factor, according to office. As shown in FIG. 11B, the controller 111 stores vector data 650 according to office, which includes office names and vectors of the respective offices in association with each other, in the HDD 112 (Step S13).

The controller 111 reads out the vector data 600 from the HDD 112, and aggregates (groups) vectors by cluster analysis into the same cluster including the one or more vectors showing similar tendency, so as to create a plurality of clusters Ck (k=1, 2, . . . ).

After this, the controller 111 obtains a mean value of the vectors which form the cluster Ck (k=1, 2, . . . ).

The controller 111 creates, as shown in FIG. 12A, base data 700 according to respondent, which includes data representing cluster names and the calculated vectors in association with each other. The controller 111 stores the created base data 700 in the HDD 112, as base data (hereinafter, referred to as base data regarding clusters of sales persons) for determining properties of the sales person which are related to the will-enhancement factors (Step S14).

Note that, as the method for aggregating (grouping) a plurality of vectors, which is used in the system of this embodiment, there is employed a Ward's clustering technique for aggregating vectors closer to each other which are included in the vector data 600 according to respondent, using Euclidean Geometry.

Similarly, the controller 111 reads out the vector data 650 according to office from the HDD 112, and aggregates a plurality of vectors showing similar tendency by cluster analysis into the same cluster, so as to create a plurality of clusters Ck (k=1, 2, . . . ).

FIG. 13 is a diagram exemplarily showing clusters according to office. FIG. 13 shows seven clusters of clusters C1 to C7. Each of the clusters a label showing characteristics of the cluster, and at least one number which represent an office corresponding to this cluster.

For example, in terms of the cluster C1, the label shows A-type (super high level), whereas the number is 17, which means an office represented by 17 is classified in this cluster C1.

After this, the controller 111 calculates a mean value of the vectors forming the clusters C1 to C7 according to office.

The controller 111 stores, as shown in FIG. 12B, base data 750 including cluster names and the calculated vectors in association with each other, in the HDD 112, as base data (hereinafter, referred to as base data of clusters according to office) for determining properties of offices which are related to the will-enhancement factors (Step S15), and thus completing the procedures of the flow.

Figure 14:
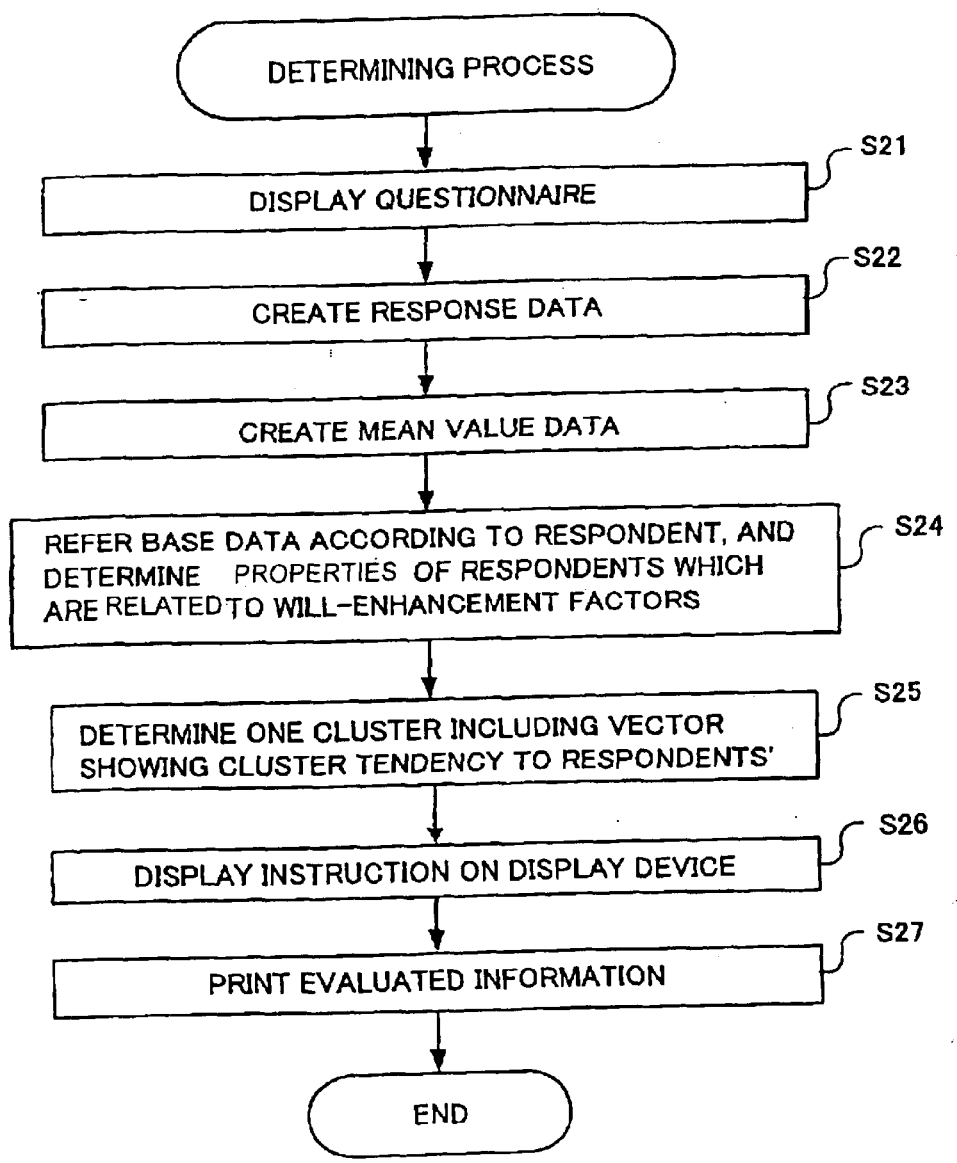
FIG. 14 is a flowchart for explaining a determination process for determining properties of target people which are related to the selected factors, which is carried out by the system of the present invention.

2) The determination process which is carried out by the system of this embodiment will now be explained with reference to the flowchart of FIG. 14.

This determination process is explained with an example in which properties of particular sales persons which are related to the selected will-enhancement factors are determined.

The sales person whose properties related to the selected will-enhancement factors to be determined accesses the server 11 from the local terminal 12-i or the remote terminal 15-j and requests the questionnaire for determining the property.

The controller 111 of the server 11 receives the request. In response to the request, the controller 111 readouts the questionnaire stored in the HDD 112 and sends it to the local terminal 12i or the remote terminal 15j. The browser of the local terminal 12i or the remote terminal 15j display pages showing questions necessary for determining property or characteristics of the sales persons with respect to the will-enhancement factors (Step S21). The questionnaire may be same as that shown in FIG. 3, or it may includes questions only relating to the selected will-enhancement factors.

As shown in FIG. 15, displayed first page 800a include a portion (text box) 801a for inputting an office of each corresponding respondent, a portion 802a for inputting the respondent's name, a portion 803a for inputting an sales amount of business done by the respondent, and a plurality of questions 804a corresponding to the seven reliable will-enhancement factors. Next to each of the questions 804a, a portion 805a for inputting a numerical value representing the answer of the question is arranged.

Note that the following pages including and after the second page 800b includes only the above question 804.

The numerical values corresponding one of which is input in the portion 805a include the following numerals from 1 to 5:

1. Strongly;
2. Somehow;
3. Maybe or Maybe Not;
4. Probably Not; and
5. Rarely.

To prevent any artificial answers, the plurality of questions are randomly arranged, for example.

The sales person fills the displayed questionnaire. Once the questionnaire is completely filled out, and the button "transmit" included in the last page is pressed, the browser send the input data to the server 11. The server 11 receives the data and the controller 111 starts to analysis the property or characteristics of the sales person.

First, the controller 111 creates response data 850 shown in FIG. 16 and stores it in the HDD 112 (Step S22). The response data 850 includes, as shown in FIG. 16, data items of "Office Name" of each respondent, "Respondent Name", "Sales Amount" of business done by the respondent, and "Answer" of the questions.

Figure 17:
FIG. 17 is a diagram showing the data structure of mean value data.

Subsequently, the controller 111 reads out the response data 850 stored in the HDD 112 and representing responses from respondents. The controller 111 obtains mean values of answers in the unit of each will-enhancement factor. The controller 111 creates mean value data 900 shown in FIG. 17, and stores the created mean value data 900 in the HDD 112 (Step S23).

The mean value data 900 includes various data items of "Office Name" of the respondent, "Respondent Name", "Sales Amount" of business done by the respondent, and "Will-Enhancement Factor", for each of the seven will-enhancement factors, each including thus obtained mean value.

After this, the controller 111 refers to the base data 500 according to respondent which is stored in the HDD 112. Then, the controller 111 determines properties of those respondents which are related to the seven will-enhancement factors, based on the mean value data 900 (Step S24).

For example, for the will-enhancement factor '1', the obtained value is 2.7, and 2.7/4.3=0.62, which is quite low. For the will-enhancement factor '2', it can be said that the obtained value is 4.2, and 4.2/4.4=0.95, which means that this will-enhancement factor '2' is about the same level as that of the respondent. In the same manner, the properties of those respondents which are related to the will-enhancement factors '3' to '7' are determined.

The controller 111 evaluates the level of factors highly contributing to enhance respondent's will to achieve business results, based on the mean value data 900 and base data 700 which are stored in the HDD 112. Then, the controller 111 determines one cluster including one or more vectors showing the closest tendency to those of the high level factors of the respondent (Step S25).

Figure 18:
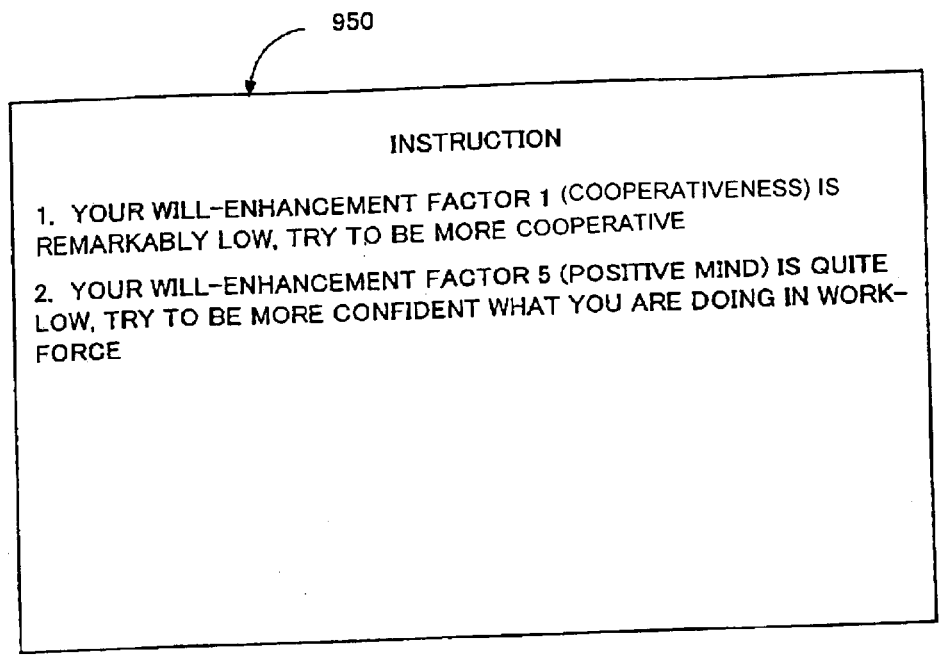
FIG. 18 is a diagram showing a display page including instruction toward sales persons and displayed on a display device.
Figure 21:
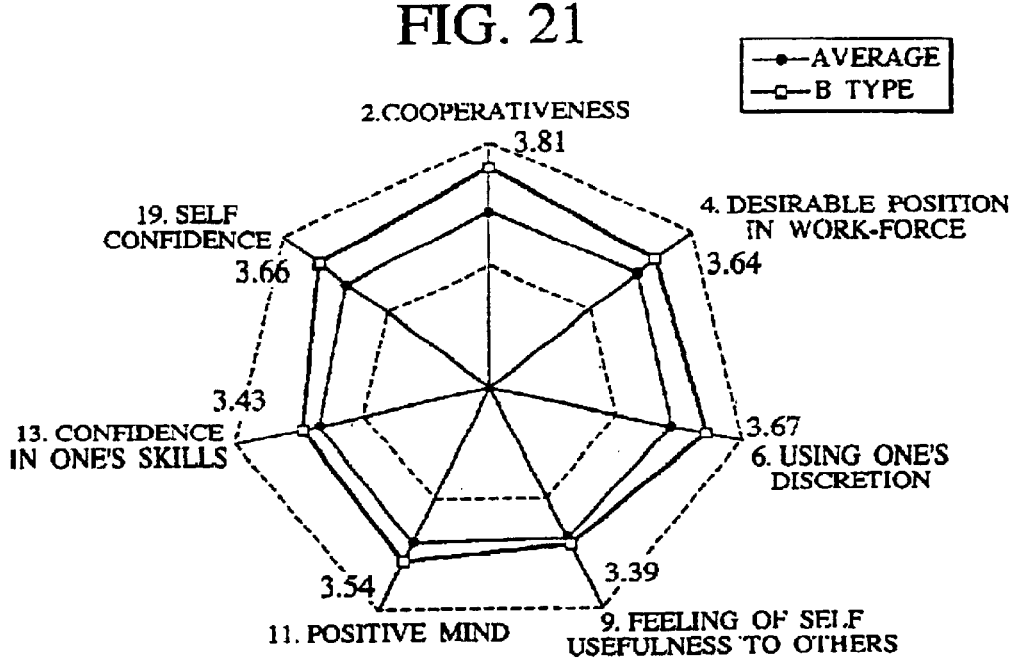
FIG. 21 is a radar chart showing mean values of the respective will-enhancement factors which are included in the base data and answers of respondent to be evaluated, in terms of cluster C2 shown in FIGS. 12A and 12B.
Figure 22:
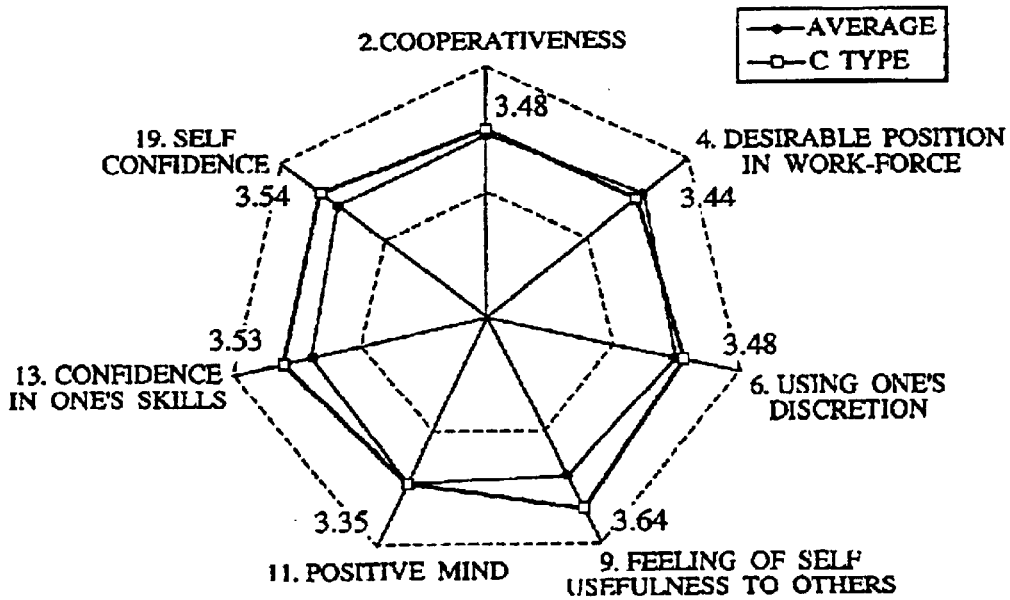
FIG. 22 is a radar chart showing mean values of the respective will-enhancement factors which are included in the base data and answers of respondent to be evaluated, in terms of cluster C3 shown in FIGS. 12A and 12B.
Figure 23:
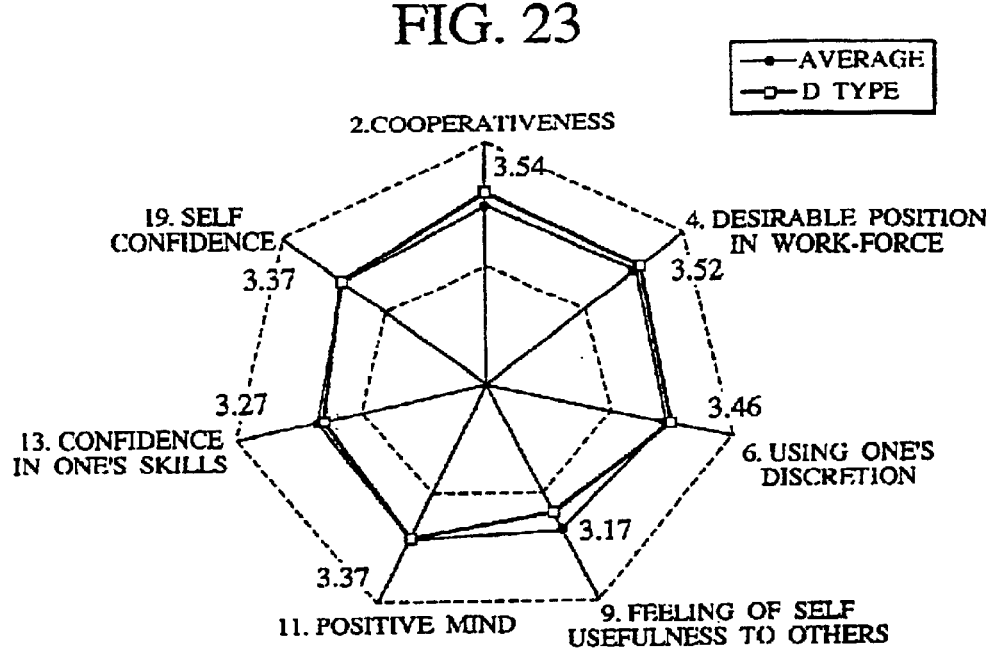
FIG. 23 is a radar chart showing mean values of the respective will-enhancement factors which are included in the base data and answers of respondent to be evaluated, in terms of cluster C4 shown in FIGS. 12A and 12B.
Figure 24:
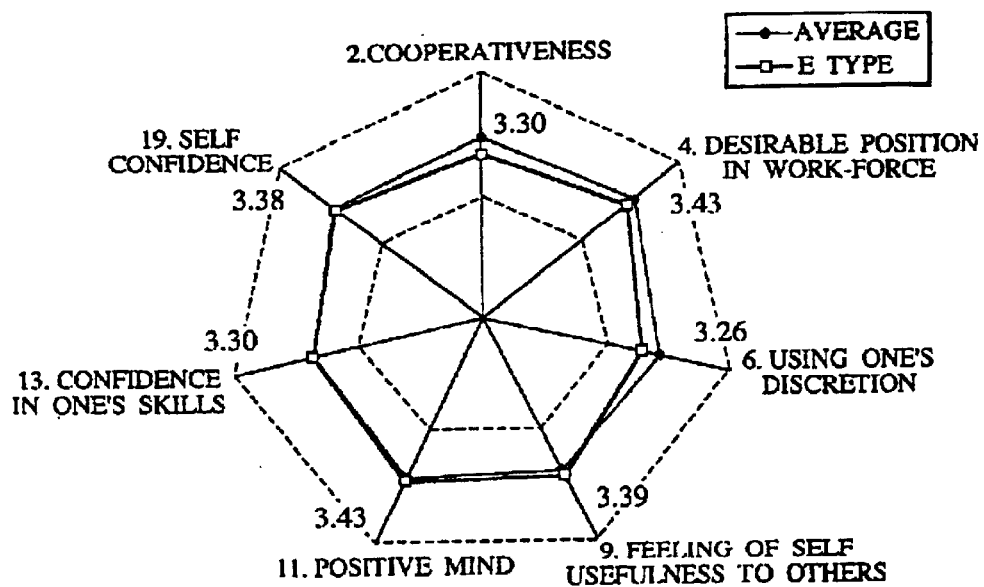
FIG. 24 is a radar chart showing mean values of the respective will-enhancement factors which are included in the base data and answers of respondent to be evaluated, in terms of cluster C5 shown in FIGS. 12A and 12B.
Figure 25:
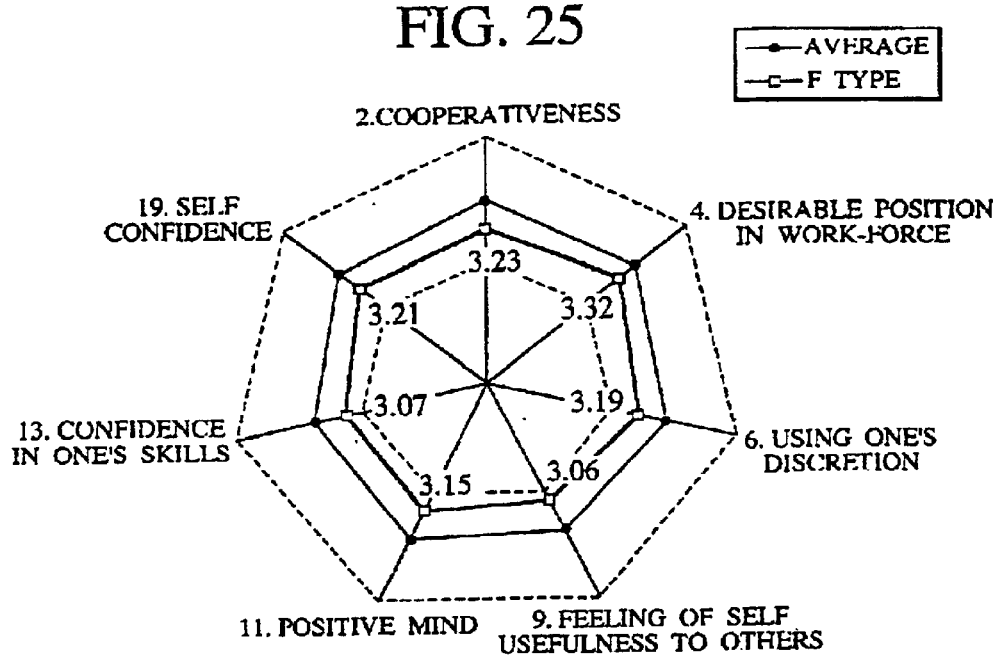
FIG. 25 is a radar chart showing mean values of the respective will-enhancement factors which are included in the base data and answers of respondent to be evaluated, in terms of cluster C6 shown in FIGS. 12A and 12B.
Figure 26:
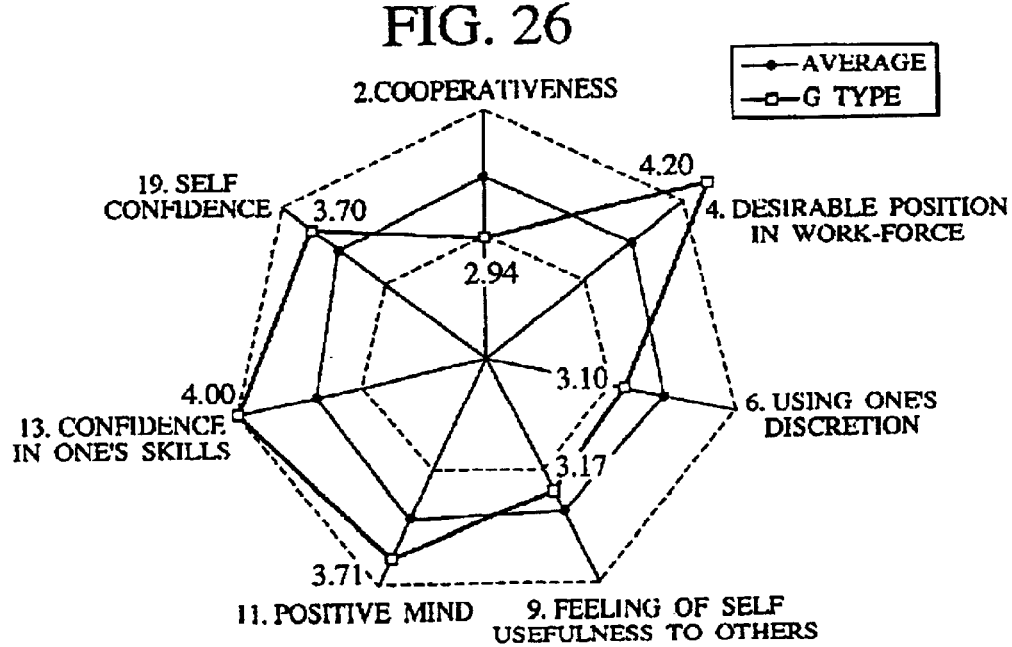
FIG. 26 is a radar chart showing mean values of the respective will-enhancement factors which are included in the base data and answers of respondent to be evaluated, in terms of cluster C7 shown in FIGS. 12A and 12B.

The controller 111 controls the display device 3 to display, as illustrated in FIG. 18, instructions regarding his/her attitude in work-force based on the levels of the factors of the respondent, for example (Step S26). Such instructions may be printed on a paper using the printer 5.

After the controller 111 evaluates the levels of the factors of the respondent, it controls the display device 3 to display information, including this evaluation and the cluster to which the factors of the respondents belongs. Otherwise, the controller 111 may control the printer 5 to print such information on a paper, or the like (Step S27), and then completing the procedures of this flow.

According to the specifying process which is carried out by the system of this embodiment, of the plurality of factors, the controller 111 can select the will-enhancement factors, based on the answers of the questions displayed on the local terminals 12-1 to 12-m or remote terminals 15-1 to 15-n.

According to the determination process which is carried out by the system of this embodiment, the controller 111 can determine the levels of the factors highly contributing to enhance workers' will to achieve business results.

Thus, it is possible to acquire information for giving adequate instruction for enhancing the workers' will to achieve business results.

In the determined process which is carried out by the system of this embodiment, the vectors included in the clusters are the data based on which the levels of the factors high contributing the enhance the respondent's will to achieve business results are evaluated. However, any other factors, at the level lower than the mean value of each will-enhancement factor stored as the base data, may be acquired.

One factor of the respondent, which shows relatively a low level compared to the rest of the will-enhancement factors, can be extracted from the seven will-enhancement factors. In the case where there is no cluster including the vector showing the similar tendency as those of the respondent, such a factor showing a relatively a low level can be obtained.

FIG. 19A shows base data for evaluating the levels of the factors of respondents according to office. In FIG. 19A, in each square column, the upper value indicates a representative value of each will-enhancement factor of each cluster. On the other hand, the lower value indicates a range within which the values of the answers from the respondents are allowable so as to belong to a corresponding cluster.

Hence, if values of the will-enhancement factors are given, as shown in FIG. 19B, the controller 111 may refer to the base data of FIG. 19A, and determine a cluster to which a corresponding group of respondents belongs.

For example, it is determined that group "1" belongs to clusters C1 and C2.

Now, the controller 111 obtains a difference between each will-enhancement factor and its corresponding representative value, and calculates the total difference obtained by summing the entire differences therebetween. Then, the controller 111 determines a cluster, to which the group "1" belongs and shows the least difference values from those of the group "1". The total difference in the case of the cluster C1 is 1.36, whereas the total difference in the case of the cluster C2 is 0.69. Therefore, the cluster to which the group "1" belongs is the cluster C2.

Instead of obtaining the total difference as above, the difference between each will-enhancement factor and its corresponding representative value of the cluster C1 may be squared, for example. The square may be added entirely to the rest of the differences therebetween within the same group, thereby producing a sum of the squares in the case of the cluster C1. The controller 111 finds the sums of the squares in the cases of the clusters C2 to C7. Then, the controller 111 finds the smallest sum of the squares, i.e. finds the cluster to which the group "1" belongs.

As shown in each of FIGS. 20 to 26, the controller 111 may prepare radar charts showing mean values of the respective will-enhancement factors which are included in the base data and answers of a respondent to be evaluated, in association with each other. The controller 111 may distribute the prepared radar charts to the personnel section, bosses of the target persons and target persons themselves by e-mail or mail, for example.

Based on the analysis, the system may advise the supervisors how to encourage the sales persons, or subordinates. In this case, the HDD 112 of the server 11 stores, for example, personnel data representing relationship between each employee and supervisors shown in FIG. 27A and advisory data explaining how to encourage the subordinates based on each factor and type of the radar chart which are explained specifically in FIGS. 27B and 27C. When the property of a worker is analyzed, the controller 111 determines his or her supervisor, and extracts advisory data suitable to the subordinate and sends it to the e-mail address of the supervisor. For example, the property shows that a person is sensitive to the factors 1 and 5, and his radar chart shows type D, the controller 111 extracts corresponding advisory data for the person having such properties from the tables shown in FIGS. 27B and 27C, checks an email address of supervisor which is included in the personnel data shown in FIG. 27A, and sends the extracted advisory data to his supervisor by e-mail. According to this system, the supervisor can enhance subordinate's will to achieve result.

The embodiment of the present invention has been described in the case of analyzing the answers of sales persons. However, the present invention is not limited to the case of sales persons. The method for enhancing people's will to achieve some kind of results may be applicable for any other types of people, such as researchers, planners, engineers, students, etc.

A program for realizing the system of this embodiment which carries out the selection and determination processes may be stored on a computer readable recording medium. The program stored on the recording medium is read by a personal computer, etc., thereby realizing the selection and determination processes. The program signal may be transmitted through the communication network by embedding it in a carrier wave.

The structure of the system is not limited to the structure shown in FIG. 1. For example, a stand alone type computer may be used as the system. Further, the questionnaire may be printed on paper. The computer may read the data written on the paper by, for example, OCR (Optical Character Reader). An operator input the answer and information about the respondents.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-171082 filed on Jun. 7, 2000, and including specification, claims, drawings and summary. The disclosure of the above Japanese Patent Application is incorporated herein by reference in its entirety.

What is claimed is:

1. A selection system for selecting factors from a plurality of factor candidates contributing to enhance target people's ability to achieve results, comprising:

A processor;

An input device; and

An output device, wherein:

Said output device outputs questions related to the plurality of candidates of factors, so as to show the questions to target people;

Said input device inputs information representing work done by the target people;

Said processor receives a response to each of the questions output by said output device, calculates a correlation coefficient representing a correlation between the information representing the work done by the target people and an evaluation value numerically representing the response to each of the questions and at least one standard deviation value based on the input information of the work done, said correlation coefficient being calculated by dividing a calculated covariance representing the work done and the evaluation value by the at least one standard deviation value of the work done, and selects the factors from the plurality of factor candidates related to the question corresponding to the response represented by the evaluation value used for calculating the correlation coefficient as factors contributing to enhance the target people's ability to achieve results, in a case where the calculated correlation coefficient is equal to or larger than a reference value;

Said processor determines properties of the target people which are related to the selected factors based on an evaluation value numerically representing a response to each of the questions relating to each of the selected factors; and Said output device outputs the determined properties of the target people.

2. The selection system according to claim 1, further including a memory device, and wherein said processor stores, in said memory device, the evaluation value numerically representing the response to each of the questions, as reference data used for determining properties of the target people which are related to the selected factors.

3. The selection system according to claim 1, further comprising a memory device, and wherein said processor:

generates an evaluation value vector including a plurality of evaluation values each numerically representing the response to each of the questions related to the selected factors as vector elements;

generates a cluster of evaluation value vectors showing similar tendency to each other; and stores the evaluation value vectors of the generated cluster in a storage device, as reference data used for determining properties of the target people which are related to the selected factors.

4. The system according to claim 1, wherein said processor refers to responses to the questions from a same group of a plurality of respondents, and determines properties of the group which are related to the selected factors contributing to enhance the target people's ability to achieve results.

5. The system according to claim 1, wherein said processor shows an instruction which is created in accordance with the determined properties of the target people, to the target people.

6. The system according to claim 1, wherein said processor:
stores reference data used for determining the properties of the target people which are related to the one or more factors; and
determines properties of the target people which are related to the selected factors, based on an evaluation value numerically representing the response to each of the questions, using the reference data stored in said storage means.

7. The system according to claim 6, wherein the reference data includes the evaluation value numerically representing the response to each of the questions relating to the selected factors.

8. The system according to claim 6, wherein the reference data is an evaluation value vector, which includes a plurality of evaluation values each numerically representing the response to each of the questions related to the selected factors as vector elements, and which belongs to a cluster of evaluation value vectors showing similar tendency to each other.

9. A selection system which selects factors from a plurality of candidates of factors, contributing to enhance people's ability to achieve results, said system comprising:
output means for outputting questions related to the plurality of candidates of factors, thereby to show the questions to target people;
reception means for receiving a response to each of the questions output by said output means;
calculation means for calculating a correlation coefficient representing a correlation between information representing work done by the target people and an evaluation value numerically representing the response to each of the questions, said correlation coefficient being calculated by dividing a calculated covariance representing the work done and the evaluation value by the at least one standard deviation value of the work done, and for calculating at least one standard deviation value based on the information representing the work done;
selection means for selecting the candidates from the plurality of candidates of factors related to the question corresponding to the response represented by the evaluation value used for calculating the correlation coefficient as factors contributing to enhance the target people's ability to achieve results, in a case where the calculated correlation coefficient is equal to or larger than a reference value;
means for determining properties of the target people which are related to the selected factors based on an evaluation value numerically representing a response to each of the questions relating to each of the selected factors; and
means for outputting the determined properties of the target people.

10. The selection system according to claim 9, wherein the questions are randomly output to prevent artificial answers.

11. A method for selecting factors from a plurality of candidates of factors, contributing to enhance people's ability to achieve results, said method comprising:
outputting, by an output device, questions related to the plurality of candidates of the factors, thereby to show the questions to target people;
receiving, by an input device, a response to each of the output questions;
calculating, by a processor, a correlation coefficient representing a correlation between information representing work done by the target people and an evaluation value numerically representing the response to each of the questions and at least one standard deviation value based on the information representing the work done, said correlation coefficient being calculated by dividing a calculated covariance representing the work done and the evaluation value by the at least one standard deviation value of the work done;
selecting, by said processor, from the plurality of candidates of factors the candidates related to the question corresponding to the response represented by the evaluation value used for calculating the correlation coefficient as factors contributing to enhance the target people's ability to achieve results, in a case where the calculated correlation coefficient is equal to or larger than a reference value;
generating, by said processor, an evaluation value vector including a plurality of evaluation values each numerically representing the response to each of the questions related to the selected factors as vector elements;
generating, by said processor a cluster of evaluation value vectors showing similar tendency to each other;
storing, by said processor, the evaluation value vectors of the generated cluster in a storage device, as reference data used for determining properties of the target people which are related to the selected factors;
determining, by said processor, properties of the target people which are related to the selected factors based on an evaluation value numerically representing a response to each of the questions relating to each of the selected factors; and
outputting, by said output device, the determined properties of the target people.

12. The method according to claim 4, further including storing, by said processor, the evaluation value numerically representing the response to each of the questions, as reference data used for determining properties of the target people which are related to the selected factors.

13. The method according to claim 11, wherein the reference data includes the evaluation value numerically representing the response to each of the questions related to the one or more factors.

14. The method according to claim 11, wherein the reference data is an evaluation value vector, which includes a plurality of evaluation values each numerically representing the response to each of the questions related to the selected factors, and which belongs to a cluster of evaluation value vectors showing similar tendency to each other.

15. The method according to claim 11, further comprising:
referring to, by said processor, responses to the questions from a same group of a plurality of respondents; and
determining, by said processor, properties of the group which are related to the selected factors contributing to enhance the target people'ability to achieve results.

16. The method according to claim 11, further comprising showing, by said processor, an instruction which is created in accordance with the determined properties of the target people, to the target people.

17. A computer readable recording medium recording a program for controlling a computer to execute:
outputting questions related to a plurality of candidates of factors which are to contribute to enhance people's ability to enhance results, thereby to show the questions to target people;

receiving a response to each of the output questions;

calculating a correlation coefficient representing a correlation between information representing work done by the target people and an evaluation value numerically representing the response to each of the questions relating to each of the candidates of factors and at least one standard deviation value based on the information representing the work done, said correlation coefficient being calculated by dividing a calculated covariance representing the work done and the evaluation value by the at least one standard deviation value of the work done;

selecting, from the plurality of candidates of the factors, candidates related to the question corresponding to the response represented by the evaluation value used for calculating the correlation coefficient as factors contributing to enhance the target people's ability to achieve results, in a case where the calculated correlation coefficient is equal to or larger than a reference value;

determining properties of the target people which are related to the selected factors based on an evaluation value numerically representing a response to each of the questions relating to each of the selected factors; and outputting the determined properties of the target people.

18. The recording medium according to claim 17, wherein said program further controls said computer to execute:

determining properties of the target people which are related to the selected factors, based on an evaluation value numerically representing the response to each of the questions, using reference data used for determining the properties of the target people.

19. The recording medium according to claim 17, wherein said program further controls said computer so that the questions are randomly output to prevent artificial answers.

20. A computer data signal embedded in a carrier wave representing a program for controlling a computer to execute:

outputting questions related to a plurality of candidates of factors which are to contribute to enhance people's ability to enhance results, thereby to show the questions to target people;

receiving a response to each of the output questions;

calculating a correlation coefficient representing a correlation between information representing work done by the target people and an evaluation value numerically representing the response to each of the questions relating to each of the candidates of factors and at least one standard deviation value based on the information of the work done, said correlation coefficient being calculated by dividing a calculated covariance representing the work done and the evaluation value by at least one standard deviation value of the work done;

selecting, from the plurality of candidates of factors, candidates related to the question corresponding to the response represented by the evaluation value used for calculating the correlation coefficient as factors contributing to enhance the target people's ability to achieve results, in a case where the calculated correlation coefficient is equal to or larger than a reference value;

determining properties of the target people which are related to the selected factors based on an evaluation value numerically representing a response to each of the questions relating to each of the selected factors; and outputting the determined properties of the target people.

21. The computer data signal according to claim 20, wherein said program further controls said computer to execute:

determining properties of the target people which are related to the selected factors, based on an evaluation value numerically representing the response to each of the questions, using reference data used for determining the properties of the target people.

22. The computer data signal according to claim 20, wherein said program further controls said computer so that the questions are randomly output to prevent artificial answers.

* * * * *